United States Patent [19]

Smith

[11] Patent Number: 5,124,871
[45] Date of Patent: Jun. 23, 1992

[54] LOCKING DEVICE FOR A VIDEO CASSETTE ELECTRONIC APPARATUS AND METHOD THEREFOR

[76] Inventor: Martin C. Smith, 18624 N. 15th Pl., Phoenix, Ariz. 85024

[21] Appl. No.: 562,264

[22] Filed: Aug. 3, 1990

[51] Int. Cl.⁵ .................................................. G11B 0/00
[52] U.S. Cl. ........................................... 360/137; 70/14
[58] Field of Search ....................... 360/137; 70/14, 58

[56] References Cited

U.S. PATENT DOCUMENTS

| | | | |
|---|---|---|---|
| 4,527,405 | 7/1985 | Renick et al. | 70/14 |
| 4,655,057 | 4/1987 | Derman | 360/137 |
| 4,922,734 | 5/1990 | Iannucci | 70/258 |
| 4,977,762 | 12/1990 | Dennis | 70/14 |

OTHER PUBLICATIONS

IBM/TDB, vol. 30, No. 8, Jan. 1988, "Security Device for a Disk Drive".

*Primary Examiner*—John H. Wolff
*Attorney, Agent, or Firm*—Harry M. Weiss

[57] ABSTRACT

A lockable video cassette apparatus for playing or recording on a video cassette, only when unlocked. The apparatus has a locking device means for insertion within the video cassette recess to lock the apparatus and prevent entry of a video cassette within the recess. The locking device means has a locking means having a key for locking the locking device means within the video cassette recess, thereby preventing entry of a video cassette therein.

4 Claims, 1 Drawing Sheet

LOCKING DEVICE FOR A VIDEO CASSETTE ELECTRONIC APPARATUS AND METHOD THEREFOR

BACKGROUND OF THE INVENTION

1. Field of Invention

This invention generally relates to video cassette electronic apparatus and method therefor, and, in particular, this invention relates to a locking device for a video cassette electronic apparatus such as a video cassette recorder (VCR) or video cassette player (VCP) and method therefor wherein the locking device is a cassette insert having a locking mechanism such as a lock and key.

2. Description of the Prior Art

The prior art video cassette recorder (VCR) and player (VCP) apparatus usually included a housing having a front wall with a video cassette recess and included VCR or VCP operating or control means having manual controls extending from the front wall.

One problem with the prior art video cassette recorder (VCR) and player (VCP) apparatus is that it was extremely difficult to prevent unwanted playing of the video cassette recorder (VCP) and player VCP apparatus. Previously anyone could simply insert any video cassette into any VCR or VCP apparatus and either record and/or play the video cassette using the VCR or VCP apparatus.

SUMMARY OF THE INVENTION

According to the present invention, a video cassette apparatus such as a VCR or VCP is provided. This apparatus comprises in combination with a video cassette recorder (VCR) or player (VCP) player (VCP) apparatus locking device means for the apparatus to prevent use of a video cassette in the VCR or VCP. The locking device means further comprises an insert to be inserted in the video cassette opening of the VCR or VCP having lock means for locking the insert in the video cassette opening of the VCR or VCP apparatus.

By using this insert in the video cassette opening and by activating locking of insert in the video cassette opening by use of the lock means associated with the insert, the prior problem of not being able to prevent unwanted playing of the video cassette recorder VCR or player (VCP) apparatus is avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
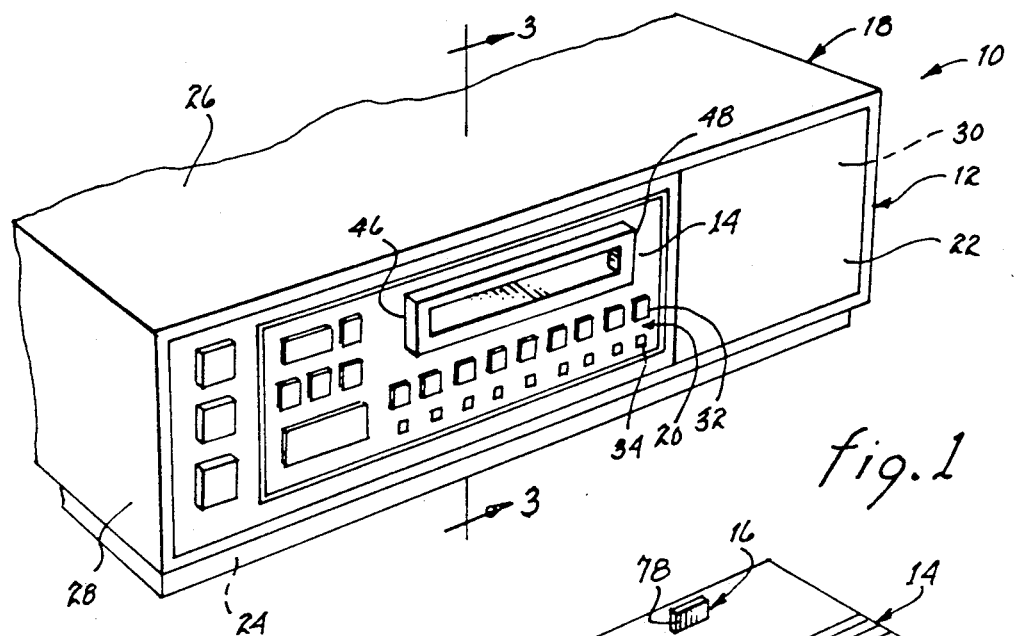
FIG. 1 is a partial perspective view of a video cassette recorder (VCR),or player (VCP) apparatus.
Figure 2:
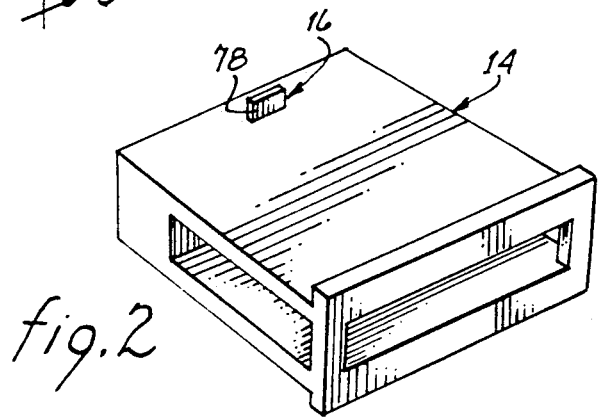
FIG. 2 is a perspective view of a locking device in accordance with this invention for the VCR or VCP apparatus FIG. 1.

According to the present invention, a video cassette recorder (VCR) or player (VCP) apparatus 10 is provided. Apparatus 10 includes a conventional video cassette recorder (VCR) player (VCP) 12, and includes locking device 14, which has a lock means 16. Apparatus 12 can also be recorder alone or a player alone.

As shown in FIGS. 1, 2, 3 and 4, apparatus 10 includes a housing 18 and an operating means 20. Housing 18 has a front wall 22, a bottom wall 24, a top wall 26, a left sidewall 28, and a right sidewall 30. Operating means 20 has a plurality of manual operable buttons 32 and lights 34. Buttons 32 extend through and outwardly from front wall 22. Front wall 22 has a slot or recess 36 (see FIG. 4) which receives the locking device 14 when apparatus 10 is in a locked condition, and which can receive a true video cassette, for playing or recording, when apparatus 10 is in an unlocked condition with the locking device 14 removed.

Recess 36 has a lower wall portion 38 (see FIG. 3 and 4) which has a surface 40, and has an upper wall portion 42, which has a surface 44. Recess 36 also has a left side surface 46 and a right side surface 48 (see FIG. 1). Upper wall portion 42 has an end face or return face 50 (see FIG. 3).

Figure 3:
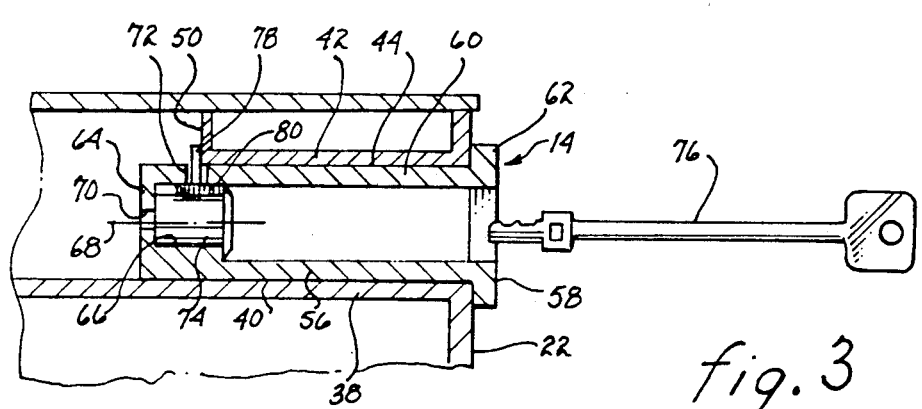
FIG. 3 is a section view as taken along lines 3—3 of FIG. 1.

Locking device 14, which is a substantially U-shaped insert type device, has a bottom flange 56, which has a bottom shoulder 58; and has a top flange 60, which has a top shoulder 62; and has a base portion 64 (see FIG. 3). Base portion 64 has a cylindrical cavity 66 which has an axis 68, and has an end push-out aperture 70 disposed along axis 68, and has a top aperture 72.

Figure 4:
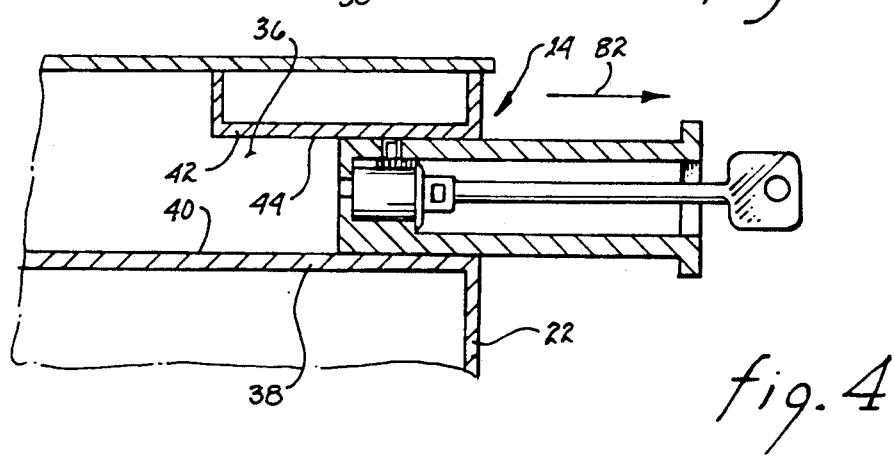
FIG. 4 is a section view corresponding to FIG. 3.

Locking means 16 has a cam-type cylinder 74, and a key 76. Cylinder 74 has a tongue or latch plate 78. Tongue 78 overlaps end face 50 in a locked condition, and retracts from out of contact with end face 50 into cylinder 74 in an unlocked condition. Tongue 78 is movable in a vertical direction by rotating cylinder 74 by means of turning key 76. Tongue 78 is movable normal to axis 68 within top aperture 72. Cylinder 74 has a guide portion 80. FIG. 3 shows key 76 outside of cylinder 74 and shows locking device 14 in a locked position. FIG. 4 shows key 76 turned 180 degrees, and shows locking device 14 in an unlocked position, and shows locking device 14 being retracted from recess 36 in a direction 82.

The method of making a lockable video cassette apparatus 10 includes the steps as indicated hereafter:

a) forming a locking device 14 which has dimensions corresponding to a true cassette for apparatus 10;

b) forming shoulders 58, 62 on the locking device 14 for positioning locking device 14 within a video cassette recess 36 of apparatus 10; and c) forming locking means 16 in locking device 14 operable by a key 76 for engaging a portion of cassette recess 36 in a locked condition.

The advantages of apparatus 10 are indicated hereafter:

A) Locking device 14 can be used with either a video cassette player (VCP), or with a video cassette recorder (VCR), or with any video cassette apparatus 10.

B) Locking device 14 prevents the entry of a true cassette in apparatus !0, when in a locked condition.

C) Locking means 16 or any similar locking mechanism (with a key, but preferably with a key) permits locking of the locking 14 within apparatus 10.

D) The person in possession of key 76 is the only person who can remove locking device 14, and can enter a true video cassette into apparatus !0, and can operate apparatus 12 for playing or recording.

E) Now, a person owning or renting or otherwise using a video cassette apparatus with the subject invention can avoid or prevent insertion by children or pranksters of garbage or undesired items or objects into the apparatus 10 through the opening provided by the video cassette apparatus recess 36.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A combined video cassette apparatus and locking device therefor comprising in combination:
   a video cassette apparatus comprising one of a video cassette recorder and video cassette player apparatus;
   video cassette operating means located in said apparatus for operating a video cassette;
   recess means located in said apparatus for receiving a video cassette;
   locking device means having a back wall spaced from a front wall of said video cassette apparatus for insertion within said recess for preventing entry of a video cassette in said recess means; and
   hidden, recessed, internal key actuated locking means located within said locking device means at an internal end portion thereof and within said apparatus spaced from said front wall thereof for selectively locking and unlocking said locking device means in said recess means.

2. The apparatus and device of claim 1, wherein said recess means having an upper wall having a surface and having an end face; said internal key-actuated locking means comprising a lock cylinder having a key and having a single latch tongue; said single latch tongue extends vertically upward for locking and retracts vertically downward for unlocking; said single latch tongue when extended vertically upward engages said end face of said upper wall of said recess means and prevents the removal of said locking device means from said apparatus.

3. The apparatus and device of claim 2 including key means having a length substantially corresponding to the depth of said recess means for selectively locking and unlocking said internal key-actuated locking means.

4. A method of making a lockable video cassette apparatus including the steps of:
   providing a video cassette apparatus;
   providing a locking device means having a back wall spaced from a front wall of said video cassette apparatus and which has exterior dimensions substantially corresponding to dimensions of a video cassette for the apparatus; and
   providing hidden, recessed, internal key-actuated locking means internally within said locking device means at an internal end portion on said back wall thereof and within said apparatus for selectively locking and unlocking said locking device means in said video cassette apparatus.

* * * * *